United States Patent
Kawata et al.

(10) Patent No.: US 12,465,299 B2
(45) Date of Patent: Nov. 11, 2025

(54) X-RAY CT APPARATUS

(71) Applicant: CANON MEDICAL SYSTEMS CORPORATION, Tochigi (JP)

(72) Inventors: Go Kawata, Moriya (JP); Sadanori Tomiha, Nasushiobara (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 272 days.

(21) Appl. No.: 18/308,817

(22) Filed: Apr. 28, 2023

(65) Prior Publication Data

US 2023/0346323 A1 Nov. 2, 2023

(30) Foreign Application Priority Data

Apr. 28, 2022 (JP) ................. 2022-074735

(51) Int. Cl.
*A61B 6/03* (2006.01)
*A61B 6/00* (2006.01)
*A61B 6/42* (2024.01)

(52) U.S. Cl.
CPC ............ *A61B 6/032* (2013.01); *A61B 6/4266* (2013.01); *A61B 6/4435* (2013.01); *A61B 6/481* (2013.01); *A61B 6/485* (2013.01)

(58) Field of Classification Search
CPC .. G01T 1/00; G01T 1/16; G01T 1/603; G01T 1/1611; G01T 1/161; G01T 1/167; G01T 1/2914; A61B 6/4014; A61B 6/40; A61B 6/405; A61B 6/4208; A61B 6/4233; A61B 6/425; A61B 6/4266; A61B 6/4275; A61B 6/481; A61B 6/482; A61B 6/483; A61B 6/485

See application file for complete search history.

(56) References Cited

U.S. PATENT DOCUMENTS 11,229,412 B2 1/2022 Kawata
2021/0121142 A1 4/2021 Kawata

FOREIGN PATENT DOCUMENTS

| JP | 6-7337 A | 1/1994 | |
|---|---|---|---|
| JP | 2021-65579 A | 4/2021 | |
| JP | 2021-533348 A | 12/2021 | |
| WO | WO-2007131038 A2 * | 11/2007 | ........... A61B 6/4014 |
| WO | WO 2020/028422 A1 | 2/2020 | |

* cited by examiner

*Primary Examiner* — Don K Wong
(74) *Attorney, Agent, or Firm* — Oblon, McClelland, Maier & Neustadt, L.L.P.

(57) ABSTRACT

An X-ray CT apparatus of one embodiment includes an X-ray tube, a first X-ray detector, a rotator, and a second X-ray detector. The X-ray tube generates an X-ray. The first X-ray detector is arranged so as to face the X-ray tube and detects the X-ray that has transmitted through a subject. The rotator supports the X-ray tube and the first X-ray detector in a rotatable manner. The second X-ray detector detects a characteristic X-ray that is generated in accordance with a substance in the subject.

15 Claims, 7 Drawing Sheets

X-RAY CT APPARATUS

CROSS-REFERENCE TO RELATED APPLICATIONS

This application is based upon and claims the benefit of priority from Japanese Patent Application No. 2022-074735, filed on Apr. 28, 2022; the entire contents of which are incorporated herein by reference.

FIELD

Embodiments described herein relate generally to an X-ray CT apparatus.

BACKGROUND

Conventionally, an X-ray computed tomography (CT) apparatus that measures X-ray energy that has transmitted through a subject and identifies content of a target substance that is included in the subject by using an acquired energy spectrum has been known.

When energy is observed as the transmission spectrum, the observed energy changes in accordance with a response function (energy resolution, escape, or pile-up) of an X-ray detector. In particular, in a living body in which a plurality of substances (water, bones, and living tissue in addition to the target substance) intervene with each other, a detector response is a cause of reduction of independence of the target substance and other substances in the observed energy spectrum.

DETAILED DESCRIPTION

One of problems to be solved by the embodiments disclosed in the present specification and the drawings is to detect an X-ray for which an observed energy spectrum is highly independent. However, the problems to be solved by the embodiments disclosed in the present specification and the drawings are not limited to the problems as described above. A problem corresponding to each of effects achieved by each of configurations illustrated in the embodiments to be described later may be regarded as another problem.

An X-ray CT apparatus according to one embodiment includes an X-ray tube, a first X-ray detector, a rotator, and a second X-ray detector. The X-ray tube generates an X-ray. The first X-ray detector is arranged so as to face the X-ray tube and detects the X-ray that has transmitted through a subject. The rotator supports the X-ray tube and the first X-ray detector in a rotatable manner. The second X-ray detector detects a characteristic X-ray that is generated in accordance with a substance in the subject.

An X-ray CT apparatus and a program according to the embodiments and the modifications will be described below with reference to the drawings.

An X-ray CT apparatus according to one embodiment will be described below with reference to the drawings. Meanwhile, embodiments are not limited to the embodiments described below. Further, in principle, details described in one embodiment may be similarly applicable to different embodiments.

Furthermore, in the embodiments below, an X-ray CT apparatus that is able to perform the photon counting CT will be described as one example, but embodiments are not limited to this example. For example, the embodiments below may be applicable to an X-ray CT apparatus that includes an integrated type (current mode measurement method) X-ray detector.

First Embodiment

Figure 1:
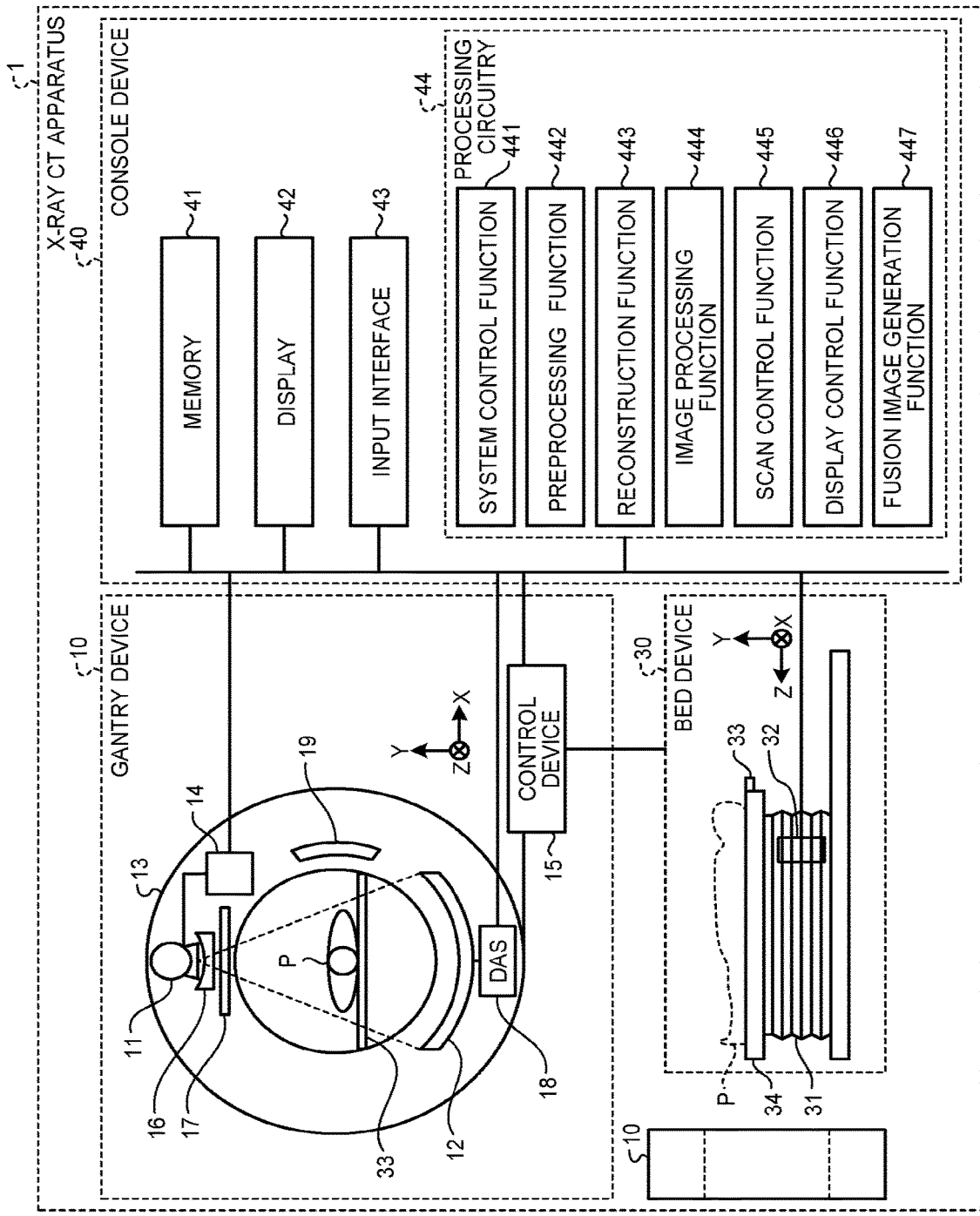
FIG. 1 is a diagram illustrating an example of a configuration of an X-ray CT apparatus according to a first embodiment.

FIG. 1 is a diagram illustrating an example of a configuration of an X-ray CT apparatus 1 according to a first embodiment. As illustrated in FIG. 1, the X-ray CT apparatus 1 according to the first embodiment includes a gantry device 10, a bed device 30, and a console device 40. In the present embodiment, a contrast agent that is made of a certain substance, such as iodine, is given as a marker to a subject P that is an object. Further, the X-ray CT apparatus 1, by applying an X-ray to the contrast agent, detects a fluorescent X-ray (characteristic X-ray) that is generated from the substance that constitutes the contrast agent and performs a quantitative analysis (quantitative imaging).

Here, in FIG. 1, a rotation axis of a rotary frame 13 in a non-tilt state or a longitudinal direction of a tabletop 33 of the bed device 30 is referred to as an Z-axis direction. Further, an axial direction that is orthogonal to the Z-axis and that is horizontal to a floor surface is referred to as an X-axis direction. Furthermore, an axial direction that is orthogonal to the Z-axis and that is perpendicular to the floor surface is referred to as a Y-axis direction. Meanwhile, the gantry device 10 is illustrated in two portions in FIG. 1 such that the gantry device 10 is drawn from a plurality of directions for convenience of explanation, and the X-ray CT apparatus 1 includes the single gantry device 10.

The gantry device 10 includes an X-ray tube 11, an X-ray detector 12, the rotary frame 13, an X-ray high-voltage generator 14, a control device 15, a wedge 16, an X-ray diaphragm 17, a data acquisition system (DAS) 18, and a fluorescent X-ray detector 19.

The X-ray tube 11 is a vacuum tube that includes a negative pole (filament) that generates a thermal electron and a positive pole (target) that generates an X-ray by being hit by the thermal electron. The X-ray tube 11 applies a thermal electron from the negative pole to the positive pole by application of high voltage from the X-ray high-voltage generator 14, and generates an X-ray that is applied to the subject P. For example, the X-ray tube 11 includes a rotary positive pole type X-ray tube that generates an X-ray by applying a thermal electron to a rotating positive pole. Meanwhile, the subject P is one example of an object.

The rotary frame 13 is an annular frame that supports the X-ray tube 11 and the X-ray detector 12 such that the X-ray tube 11 and the X-ray detector 12 face each other, and rotates the X-ray tube 11 and the X-ray detector 12 by the control device 15. In this manner, the rotary frame 13 supports the X-ray tube 11 and the X-ray detector 12 in a rotatable manner. For example, the rotary frame 13 is a casting that is made of aluminum. Meanwhile, the rotary frame 13 is able to further support the X-ray high-voltage generator 14, the wedge 16, the X-ray diaphragm 17, the DAS 18, and the like in addition to the X-ray tube 11 and the X-ray detector 12. Further, the rotary frame 13 is able to further support various components that are not illustrated in FIG. 1. The rotary frame 13 is one example of a rotation unit.

The wedge 16 is a filter for adjusting an amount of an X-ray that is applied from the X-ray tube 11. Specifically, the wedge 16 is a filter that transmits and attenuates the X-ray that is applied from the X-ray tube 11 such that a distribution of the X-ray that is applied from the X-ray tube 11 to the subject P conforms to a distribution that is determined in advance. For example, the wedge 16 may be a wedge filter or a bow-tie filter, and is a filter that is obtained by processing aluminum or the like so as to have a predetermined target angle or a predetermined thickness.

The X-ray diaphragm 17 is a lead plate or the like for narrowing down an application range of the X-ray that has transmitted through the wedge 16, and a slit is formed by a combination of a plurality of lead plates or the like. Meanwhile, the X-ray diaphragm 17 may also be referred to as a front collimator. Further, FIG. 1 illustrates a case in which the wedge 16 is arranged between the X-ray tube 11 and the X-ray diaphragm 17, but the X-ray diaphragm 17 may be arranged between the X-ray tube 11 and the wedge 16. In this case, the wedge 16 transmits and attenuates the X-ray which is applied from the X-ray tube 11 and for which the application range is limited by the X-ray diaphragm 17.

The X-ray high-voltage generator 14 includes an electric circuit, such as a transformer or a rectifier, a high-voltage generator that generates high voltage that is applied to the X-ray tube 11, and an X-ray control device that controls output voltage in accordance with the X-ray that is generated by the X-ray tube 11. The high-voltage generator may be of a transformer system or an inverter system. Meanwhile, the X-ray high-voltage generator 14 may be arranged on the rotary frame 13 or a fixed frame (not illustrated).

The control device 15 includes processing circuitry that includes a central processing unit (CPU) or the like, and a driving mechanism, such as a motor or an actuator. The control device 15 receives an input signal from an input interface 43, and controls operation of the gantry device 10 and the bed device 30. For example, the control device 15 controls rotation of the rotary frame 13, tilt of the gantry device 10, operation of the bed device 30 and the tabletop 33, and the like. As one example, as the control of tilting the gantry device 10, the control device 15 rotates the rotary frame 13 about an axis that is parallel to the X-axis direction based on input information on an inclination angle (tilt angle). Meanwhile, the control device 15 may be arranged on the gantry device 10 or may be arranged on the console device 40.

The X-ray detector 12 is arranged so as to face the X-ray tube 11 and detects an X-ray that has transmitted through the subject P. The X-ray detector 12 outputs a signal capable of measuring an energy value of an X-ray photon every time the X-ray photon is input. The X-ray photon is an X-ray photon that is applied from the X-ray tube 11 and that has transmitted through the subject P, for example. The X-ray detector 12 includes a plurality of detection elements each of which outputs an electrical signal (analog signal) of one pulse every time the X-ray photon is input. By counting the number of the electrical signals (pulses), it is possible to count the number of X-ray photons that are incident on each of the detection elements. Further, the X-ray detector 12 is able to measure the energy value of the X-ray photon that has induced output of the signal, by performing a predetermined arithmetic process on the signal. Meanwhile, on an X-ray incident surface side of the X-ray detector 12, a collimator is arranged to reduce a scattered X-ray. The collimator may also be referred to as a scattered-ray removal grid or a rear collimator.

Each of the detection elements as described above is a sensor that is configured with a plurality of electrodes and detects radiation. For example, the detection element is a combination of a scintillator that generates light (scintillation light) corresponding to the incident X-ray photon and a complementary metal-oxide semiconductor (CMOS) that converts the scintillation light to an electrical signal. That is, the X-ray detector 12 is a detector of an indirect conversion type in which a phosphor that generates light by being excited by the radiation and an optical detector that converts the light generated by the phosphor to an electrical signal are combined.

The X-ray detector 12 includes the plurality of detection elements as described above and a plurality of application specific integrated circuits (ASICs) that are connected to the detection elements and that count the number of X-ray photons detected by the detection elements. The ASICs count the number of X-ray photons that are incident on the detection elements by performing pulse-height discrimination on electric pulses with heights that are proportional to an individual amount of charges output by the detection elements. Further, the ASICs perform arithmetic processing based on magnitude of each of charges and measure energy (energy value) of the counted X-ray photons. Furthermore, the ASICs output, as digital data, a result of the counted number of the X-ray photons to the DAS 18. The X-ray detector 12 is one example of a first X-ray detector. Moreover, the X-ray detector 12 is an X-ray detector of a photon counting type.

The fluorescent X-ray detector 19 detects a fluorescent X-ray that is generated in accordance with a substance in the subject P. The fluorescent X-ray detector 19 detects the fluorescent X-ray that is generated, by application of the X-ray, from the substance that constitutes the contrast agent given to the subject P, and outputs a signal corresponding to an X-ray amount of the detected fluorescent X-ray to the DAS 18. The fluorescent X-ray detector 19 includes a plurality of detection element arrays in which a plurality of detection elements are arranged in a channel direction along a single circular arc centered at a focus point of the X-ray tube 11, for example. The fluorescent X-ray detector 19 has a structure in which, for example, a plurality of detection element arrays, in each of which the plurality of detection elements are arranged in the channel direction, are arranged in a column direction (a slice direction or a row direction).

The fluorescent X-ray detector 19 is arranged at a position that is excluded from a path of an X-ray that is applied form the X-ray tube 11 as illustrated in FIG. 1, for example. That is, the fluorescent X-ray detector 19 is arranged at a position at which the X-ray that is applied from the X-ray tube 11 are not input. Further, the fluorescent X-ray detector 19 is arranged at a position at which the fluorescent X-ray that is generated from the substance that constitutes the contrast agent are input. That is, the fluorescent X-ray detector 19 is arranged at a position at which it is possible to detect the fluorescent X-ray among the X-ray that is applied from the X-ray tube 11 and the fluorescent X-ray. Meanwhile, the fluorescent X-ray are emitted in an isotropic manner in all directions and is monochromatic.

For example, the fluorescent X-ray detector 19 is a detector of an indirect conversion type that includes a scintillator array and an optical sensor array. The scintillator array includes a plurality of scintillators. Each of the scintillators includes a scintillator crystal that outputs light with a certain amount of photons corresponding to the amount of an incident X-ray. The optical sensor array has a function for conversion into an electrical signal corresponding to the amount of light from the scintillators, and includes, for example, an optical sensor, such as a photodiode. Meanwhile, the fluorescent X-ray detector 19 may be a detector of a direct conversion type that includes a semiconductor element that convers the incident X-ray to an electrical signal. Further, the fluorescent X-ray detector 19 may be an X-ray detector of a photon counting type.

Figure 2:
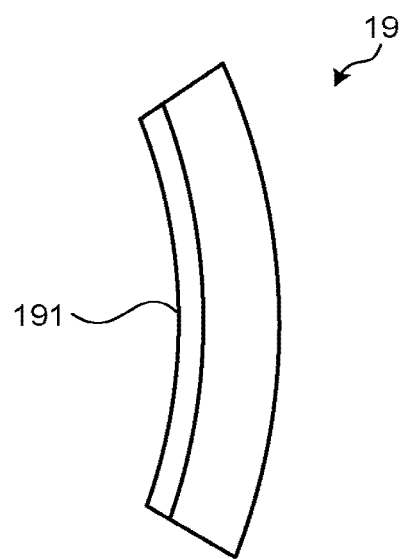
FIG. 2 is a diagram illustrating an example of a configuration of a fluorescent X-ray detector according to the first embodiment.

FIG. 2 is a diagram illustrating an example of a configuration of the fluorescent X-ray detector 19 according to the first embodiment. As illustrated in FIG. 2, on an X-ray incident surface of the fluorescent X-ray detector 19, an identification unit 191 that identifies an incident direction of the fluorescent X-ray that is detected by the fluorescent X-ray detector 19 is arranged.

The identification unit 191 is, for example, a collimator that allows incidence of the fluorescent X-ray from only a specific incident direction. If the identification unit 191 is a collimator, the collimator may be detachably attached to a surface of the fluorescent X-ray detector 19 at the X-ray incident side. Furthermore, a collimator with an appropriate size corresponding to a size of the subject P may be used as the identification unit 191.

Meanwhile, the identification unit 191 is not limited to the collimator. For example, the identification unit 191 may have the same function as a Compton camera, and identify an incident direction of the fluorescent X-ray that is detected by the fluorescent X-ray detector 19 by using this function. For example, the identification unit 191 may include a scattering body and an absorbing body, and identify an incident direction of the incident fluorescent X-ray by causing the fluorescent X-ray incident on the scattering body to scatter and causing the absorbing body to capture the scattered fluorescent X-ray. That is, the identification unit 191 may include a scattering body and identify an incident angle of the fluorescent X-ray based on a scattering angle of the fluorescent X-ray of the scattering body. Examples of the Compton camera as described above include an electron-tracking Compton camera (https://www.yamagata-u.ac.jp/jp/information/press/20181024_01/). Meanwhile, the electron-tracking detector Compton camera may also be referred to as an electron-tracking Compton camera.

The DAS 18 is an electronic circuit that outputs digital data based on a signal that is output from each of the X-ray detector 12 and the fluorescent X-ray detector 19. For example, the DAS 18 generates detection data (digital data) based on a result of the counting process input from the X-ray detector 12. The detection data is, for example, a sinogram. The sinogram is data in which results of counting processes input to the respective detection elements at each of positions in the X-ray tube 11 are arrayed. The sinogram is data in which the results of the counting processes are arranged in a two-dimensional rectangular coordinate system in which a view direction and a channel direction are adopted as axes. The DAS 18 generates, for example, the sinogram for each column in the slice direction in the X-ray detector 12. Here, the results of the counting processes are data to which the number of photons of the X-ray for each energy bin is assigned. For example, the DAS 18 counts the number of photons (X-ray photons) derived from an X-ray that is irradiated from the X-ray tube 11 and that has transmitted through the subject P, discriminates energy of the counted X-ray photons, and adopts the energy as the results of the counting processes.

Furthermore, the DAS 18 includes an amplifier that performs an amplification process on an electrical signal that is output from each of the detection elements of the fluorescent X-ray detector 19, and an A/D converter that converts the electrical signal into a digital signal, and generates detection data. Meanwhile, if the fluorescent X-ray detector 19 is an X-ray detector of a photon counting type, the DAS 18 may generate the detection data based on the results of the counting processes input from the fluorescent X-ray detector 19, by the same method as the method of generating the detection data based on the results of the counting processes input from the X-ray detector 12.

Here, not only a fluorescent X-ray that is emitted from an objective substance (target substance) that constitutes the contrast agent, but also a fluorescent X-ray that is emitted from substances other than the target substance, such as a fluorescent X-ray emitted from water and a fluorescent X-ray emitted from bones, are incident on the fluorescent X-ray detector 19. Therefore, in the present embodiment, the DAS 18 generates the detection data based on the fluorescent X-ray with energy in an energy window corresponding to the target substance and does not generate the detection data from the fluorescent X-ray with energy outside of the energy window. Meanwhile, the energy in the energy window means energy in an energy range that is indicated by the energy window, for example. The energy range is an energy range corresponding to the target substance. Similarly, the energy outside of the energy window means energy outside of the energy range that is indicated by the energy window, for example. In this manner, the DAS 18 generates the detection data based on the fluorescent X-ray that is emitted from the target substance among the fluorescent X-ray that is emitted from the target substance and the fluorescent X-ray that is emitted from the substances other than the target substance. Meanwhile, the fluorescent X-ray detector 19 may output the electrical signal based on the fluorescent X-ray that is emitted from the target substance among the fluorescent X-ray that is emitted from the target substance and the fluorescent X-ray that is emitted from the substances other than the target substance to the DAS 18 in the same manner. In this case, the DAS 18 generates the detection data based on the electrical signal that is based on the fluorescent X-ray emitted from the target substance.

Further, the DAS 18 transfers the generated detection data to the console device 40. For example, the data generated by the DAS 18 is transmitted from a transmitter including a light emitting diode (LED) that is arranged on the rotary frame 13 to a receiver including a photodiode that is arranged on a non-rotary part (for example, a fixed frame or the like, illustration of which is omitted in FIG. 1) of the gantry device 10 by optical communication, and further transferred to the console device 40. Here, the non-rotary part is, for example, a fixed frame or the like that supports the rotary frame 13 in a rotatable manner. Meanwhile, the method of transmitting the data from the rotary frame 13 to the non-rotary part of the gantry device 10 is not limited to the optical communication, but it may be possible to adopt any data transmission method of a contactless type or a data transmission method of a contact type.

The bed device 30 is a device for mounting and moving the subject P that is an imaging target, and includes a pedestal 31, a couch driving device 32, the tabletop 33, and a support frame 34. The pedestal 31 is a casing that supports the support frame 34 such that the support frame 34 is movable in a vertical direction. The couch driving device 32 is a driving mechanism that moves the tabletop 33 on which the subject P is placed in a long-axis direction of the tabletop 33, and includes a motor, an actuator, and the like. The tabletop 33 that is arranged on an upper surface of the support frame 34 is a plate on which the subject P is placed. Meanwhile, the couch driving device 32 may move the support frame 34 in the long-axis direction of the tabletop 33 in addition to the tabletop 33.

The console device 40 includes a memory 41, a display 42, the input interface 43, and a processing circuitry 44. Meanwhile, the console device 40 is explained as a separate apparatus from the gantry device 10, but the console device 40 or a part of constituent elements of the console device 40 may be included in the gantry device 10.

The memory 41 is implemented by, for example, a semiconductor memory device, such as a random access memory (RAM) or a flash memory, a hard disk, an optical disk, or the like. The memory 41 stores therein, for example, projection data or CT image data. Further, for example, the memory 41 stores therein a program for causing circuitry that is included in the X-ray CT apparatus 1 to implement functions. Meanwhile, the memory 41 may be implemented by a server group (cloud) that is connected to the X-ray CT apparatus 1 via a network.

The display 42 displays various kinds of information. For example, the display 42 displays various kinds of images that are generated by the processing circuitry 44, or displays a graphical user interface (GUI) for receiving various kinds of operation from an operator. For example, the display 42 is a liquid crystal display or a cathode ray tube (CRT) display. The display 42 may be a desktop type or may be configured by a tablet terminal or the like that is able to perform wireless communication with a main body of the console device 40. The display 42 is one example of a display unit.

The input interface 43 receives various kinds of input operation from the operator, converts the received input operation into an electrical signal, and outputs the electrical signal to the processing circuitry 44. Further, for example, the input interface 43 receives, from the operator, input operation for a reconstruction condition that is adopted when CT image data is reconstructed or an image processing condition that is adopted when a post-processing image is generated from CT image data.

For example, the input interface 43 is implemented by a mouse, a keyboard, a trackball, a switch, a button, a joystick, a touch pad that performs input operation by touching an operation surface, a touch screen in which a display screen and a touch pad is integrated, a contactless input circuitry using an optical sensor, voice input circuitry, or the like. Meanwhile, the input interface 43 may be arranged on the gantry device 10. Further, the input interface 43 may be configured by a tablet terminal or the like that is able to perform wireless communication with the main body of the console device 40. Furthermore, the input interface 43 is not limited to a device that includes a physical component, such as a mouse or a keyboard. For example, examples of the input interface 43 also include electrical signal processing circuitry that receives an electrical signal corresponding to the input operation from an external input device that is arranged separately from the console device 40, and outputs the electrical signal to the processing circuitry 44. The input interface 43 is one example of an input unit.

The processing circuitry 44 controls the entire operation of the X-ray CT apparatus 1. For example, the processing circuitry 44 implements a system control function 441, a preprocessing function 442, a reconstruction function 443, an image processing function 444, a scan control function 445, a display control function 446, and a fusion image generation function 447. Here, each of processing functions of the system control function 441, the preprocessing function 442, the reconstruction function 443, the image processing function 444, the scan control function 445, the display control function 446, and the fusion image generation function 447 that are constituent elements of the processing circuitry 44 illustrated in FIG. 1 is recorded in, for example, the memory 41 in the form of a program that is executable by a computer. The processing circuitry 44 is implemented by, for example, a processor, and implements the functions corresponding to each of programs by reading each of the programs from the memory 41 and executing each of the programs. In other words, the processing circuitry 44 in the state in which each of the programs are read has each of the functions illustrated in the processing circuitry 44 in FIG. 1.

Meanwhile, FIG. 1 illustrates a case in which each of the processing functions of the system control function 441, the preprocessing function 442, the reconstruction function 443, the image processing function 444, the scan control function 445, the display control function 446, and the fusion image generation function 447 is implemented by the single processing circuitry 44, but embodiments are not limited to this example. For example, the processing circuitry 44 may be configured by a combination of a plurality of independent processors and implement each of the processing functions by causing each of the processors to execute each of the programs. Further, each of the processing functions included in the processing circuitry 44 may be implemented by being appropriately distributed to a plurality of processing circuitry or integrated into single processing circuitry.

The system control function 441 controls various functions of the processing circuitry 44 based on the input operation that is received from the operator via the input interface 43.

The preprocessing function 442 generates projection data by performing pre-processing, such as a logarithmic transformation process, an offset correction process, a sensitivity correction process between channels, or a beam hardening correction, on the detection data that is output from the DAS 18.

The reconstruction function 443 generates CT image data by performing a reconstruction process using a filtered back projection method, a successive approximation reconstruction method, or the like on the projection data that is generated by the preprocessing function 442. The reconstruction function 443 stores the reconstructed CT image data in the memory 41. Meanwhile, the CT image data that is generated by the reconstruction function 443 includes CT image data that is derived from the fluorescent X-ray that is detected by the fluorescent X-ray detector 19 and CT image data that is derived from the X-ray (transmitted X-ray) that is detected by the X-ray detector 12. The reconstruction function 443 uses information on the incident direction of the fluorescent X-ray identified by the identification unit 191, when generating the CT image data derived from the fluorescent X-ray that is detected by the fluorescent X-ray detector 19.

Here, the projection data that is generated from the counting result obtained by the photon counting CT includes information on energy of the X-ray that is weakened by transmission through the subject P. Therefore, the reconstruction function 443 is able to reconstruct the CT image data of a specific energy component, for example. Further, the reconstruction function 443 is able to reconstruct CT image data of each of energy components, for example.

Furthermore, the reconstruction function 443 is able to assign a color tone corresponding to the energy component to each of pixels of the CT image data of each of the energy components, and generate image data in which the plurality of pieces of CT image data that are color coded in accordance with the energy components are superimposed, for example. Moreover, the reconstruction function 443 is able to generate image data by which a certain substance can be identified by using a k-absorption edge that is unique to the substance, for example. Examples of other image data that is generated by the reconstruction function 443 include monochrome X-ray image data, density image data, and effective atomic number image data.

To reconstruct the CT image data, projection data corresponding to a circumference, that is 360 degrees, of the subject is needed, and projection data corresponding to 180 degrees and a fan angle is needed even with use of a half scan method. Any of the reconstruction method is applicable to the present embodiment. In the following, for simplicity of explanation, it is assumed that a reconstruction method (full scan reconstruction) for reconstruction using the projection data corresponding to a circumference, that is, 360 degrees, of the subject is used.

The image processing function 444 converts the CT image that is generated by the reconstruction function 443 to various kinds of image data, such as a tomographic image of an arbitrary cross-section or a three-dimensional image by a rendering process, by a well-known method based on the input operation that is received from the operator via the input interface 43.

Furthermore, the image processing function 444 generates image data (marker distributed image data) in which a color corresponding to intensity of the fluorescent X-ray is assigned to each of the pixels by performing predetermined image processing on the CT image data that is derived from the fluorescent X-ray. In this manner, the marker distributed image data in which the color corresponding to density of a contrast agent that is a marker is generated.

Through the method as described above, the image processing function 444 generates various kinds of image data. Further, the image processing function 444 stores the generated (converted) image data in the memory 41.

The scan control function 445 controls CT scan that is performed by the gantry device 10. For example, the scan control function 445 controls operation of the X-ray high-voltage generator 14, the X-ray detector 12, the control device 15, the DAS 18, the fluorescent X-ray detector 19, and the couch driving device 32 and controls a process of collecting the counting results by the gantry device 10. As one example, the scan control function 445 controls a process of collecting the projection data in image capturing for collecting positioning images (scanogram images) and image capturing for collecting images used for diagnosis.

The display control function 446 causes the display 42 to display various kinds of images based on various kinds of image data stored in the memory 41.

The fusion image generation function 447 generates fusion image data by using the image data (morphological image data) that is generated from the CT image data derived from the X-ray that is detected by the X-ray detector 12 and by using the marker distributed image data that is generated from the CT image data derived from the fluorescent X-ray. For example, the fusion image generation function 447 acquires the morphological image data and the marker distributed image data from the memory 41. Further, the fusion image generation function 447 generates the fusion image data by synthesizing the morphological image data and the marker distributed image data. Furthermore, the fusion image generation function 447 stores the generated fusion image data in the memory 41.

Meanwhile, the term "processor" described in the explanation above indicates circuitry, such as a central processing unit (CPU), a graphics processing unit (GPU), an application specific integrated circuit (ASIC), or a programmable logic device (for example, a simple programmable logic device (SPLD), a complex programmable logic device (CPLD), or a field programmable gate array (FPGA)). The processor implements the functions by reading a program that is stored in memory circuitry and executing the read program. Meanwhile, it may be possible to directly incorporate the program in circuitry of the processor instead of storing the program in the memory circuitry. In this case, the processor implements the functions by reading the program that is incorporated in the circuitry and executing the read program. Meanwhile, each of the processors of the present embodiment need not always be configured as single circuitry for each of the processors, but may be configured as a single processor by combining a plurality of independent circuitry and implement the functions.

Figure 3:
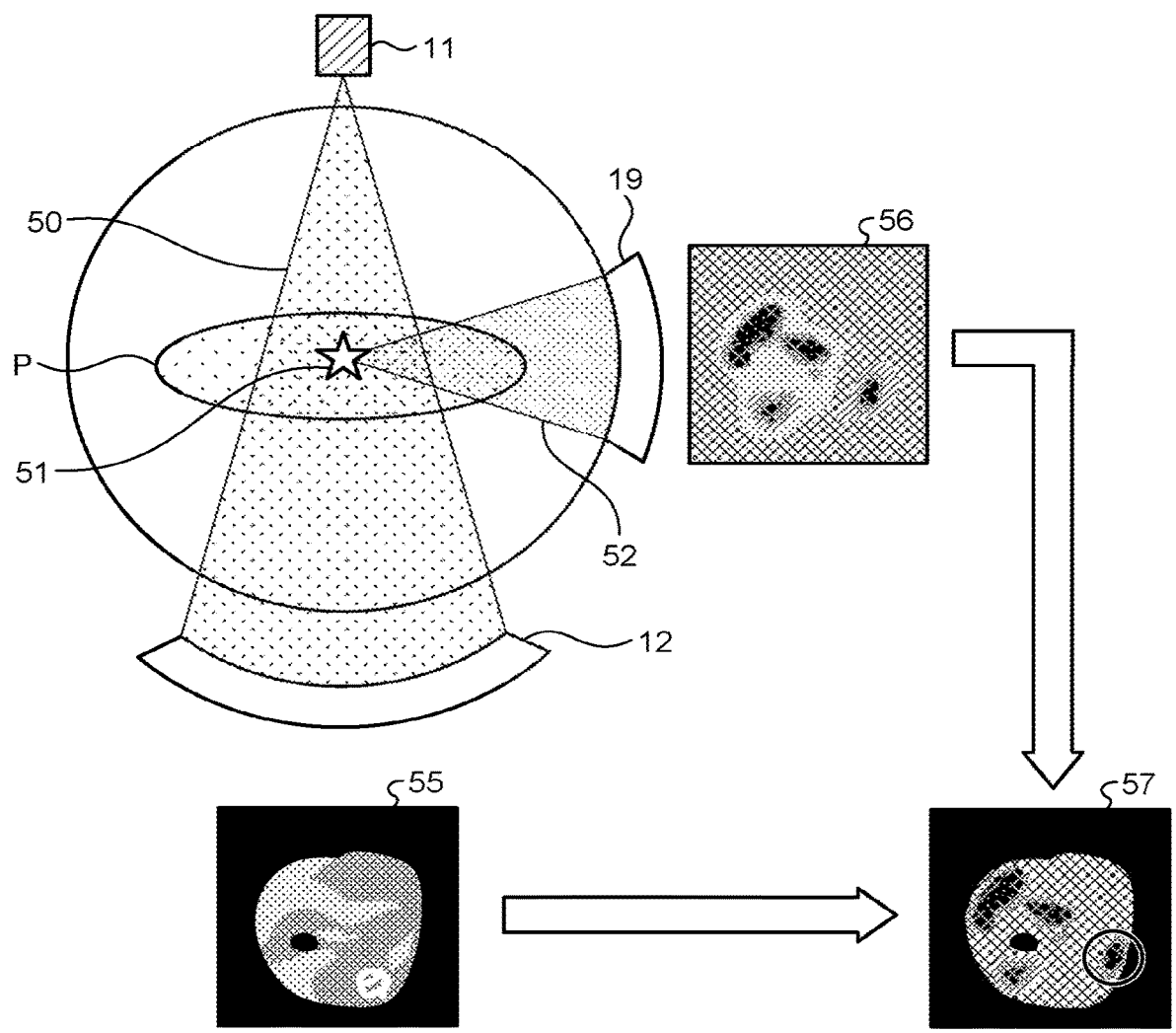
FIG. 3 is a diagram for explaining an example of a process of generating fusion image data by the X-ray CT apparatus according to the first embodiment.
Figure 3:
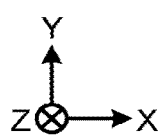
Figure 4:
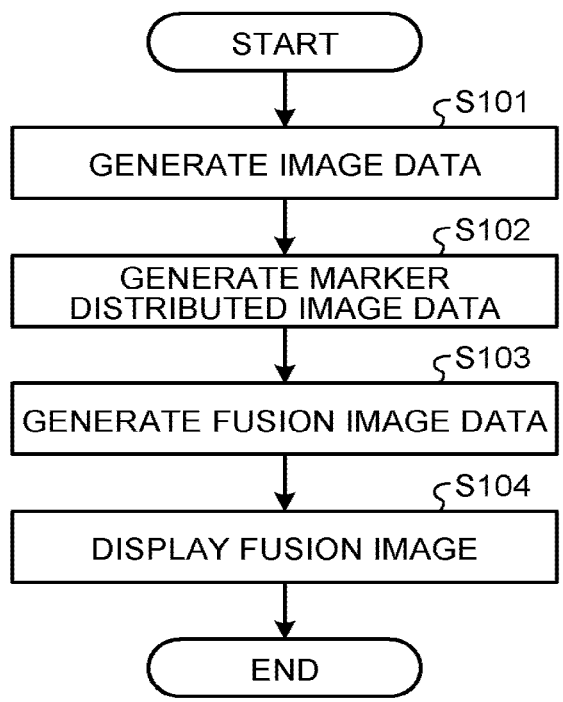
FIG. 4 is a flowchart illustrating an example of the flow of a process of generating the fusion image data according to the first embodiment.

An example of operation of the X-ray CT apparatus 1 according to the first embodiment will be described below with reference to FIG. 3 and FIG. 4. FIG. 3 is a diagram for explaining an example of a process of generating the fusion image data by the X-ray CT apparatus 1 according to the first embodiment. FIG. 4 is a flowchart illustrating an example of the flow of the process of generating the fusion image data according to the first embodiment.

As illustrated in FIG. 3 and FIG. 4, at Step S101, the image processing function 444 generates morphological image data 55 from CT image data that is derived from an X-ray 50 that is detected by the X-ray detector 12. Specifically, the reconstruction function 443 and the image processing function 444 acquire the morphological image data 55 that is reconstructed image data that is reconstructed based on the data detected by the X-ray detector 12. The morphological image data 55 is one example of first reconstructed image data. The reconstruction function 443 and the image processing function 444 are one example of a reconstruction unit. Meanwhile, the X-ray 50 is an X-ray that is generated by the X-ray tube 11 and that has transmitted through the subject P.

Subsequently, at Step S102, the image processing function 444 generates marker distributed image data 56 by performing predetermined image processing on the CT image data that is derived from a fluorescent X-ray 52 that is generated by a contrast agent 51. Specifically, the reconstruction function 443 and the image processing function 444 acquire the marker distributed image data 56 that is reconstructed image data that is reconstructed based on the data detected by the fluorescent X-ray detector 19. The marker distributed image data 56 is one example of second reconstructed image data.

Subsequently, at Step S103, the fusion image generation function 447 generates fusion image data 57 by synthesizing the morphological image data 55 and the marker distributed image data 56. Specifically, the fusion image generation function 447 generates the fusion image data 57 by associating the morphological image data 55 and the marker distributed image data 56 with each other. The fusion image data 57 is one example of display image data. The fusion image generation function 447 is one example of a generation unit.

Subsequently, at Step S104, the display control function 446 causes the display 42 to display a fusion image based on the fusion image data 57, and terminates the process illustrated in FIG. 4. Meanwhile, the fusion image is an image (synthetic image) that is obtained by synthesizing a morphological image based on the morphological image data 55 and a marker distributed image based on the marker distributed image data 56.

Thus, the X-ray CT apparatus 1 according to the first embodiment has been described. The X-ray CT apparatus 1 directly detects (observes) the fluorescent X-ray 52 that is monochrome and that is generated from a substance included in the contrast agent 51. Therefore, according to the X-ray CT apparatus 1, it is possible to detect the fluorescent X-ray 52 that is an X-ray for which an observed energy spectrum is highly independent. Furthermore, according to the X-ray CT apparatus 1, the energy of the fluorescent X-ray 52 is directly measured, so that it is possible to acquire the marker distributed image data 56 in which a background, such as water and bones, of the subject P is eliminated and which is highly independent.

Moreover, according to the X-ray CT apparatus 1, it is possible to improve identification accuracy of a marker substance by synthesizing a morphological image that is based on the transmission spectrum and a marker distributed image that is a fluorescent X-ray image.

Furthermore, according to the X-ray CT apparatus 1, with use of the fluorescent X-ray 52, it is possible to quantitatively visualize the constant agent that is a marker in the marker distributed image.

Moreover, the background, such as water and bones, of the subject P is eliminated, so that it is possible to improve contrast of the marker distributed image data 56. For example, a contrast-to-noise ratio (CNR) of the marker distributed image data 56 is increased as compared to a CNR of image data that is generated by conventional cone beam CT.

Second Embodiment

In the first embodiment, the case has been described in which the X-ray CT apparatus 1 includes the single fluorescent X-ray detector 19. However, the X-ray CT apparatus 1 may include the plurality of fluorescent X-ray detectors 19. Therefore, an embodiment as described above will be described below as a second embodiment. Meanwhile, in the explanation of the second embodiment, a difference from the first embodiment will be mainly described, and the same configuration as the first embodiment may be omitted in some cases.

Figure 5:
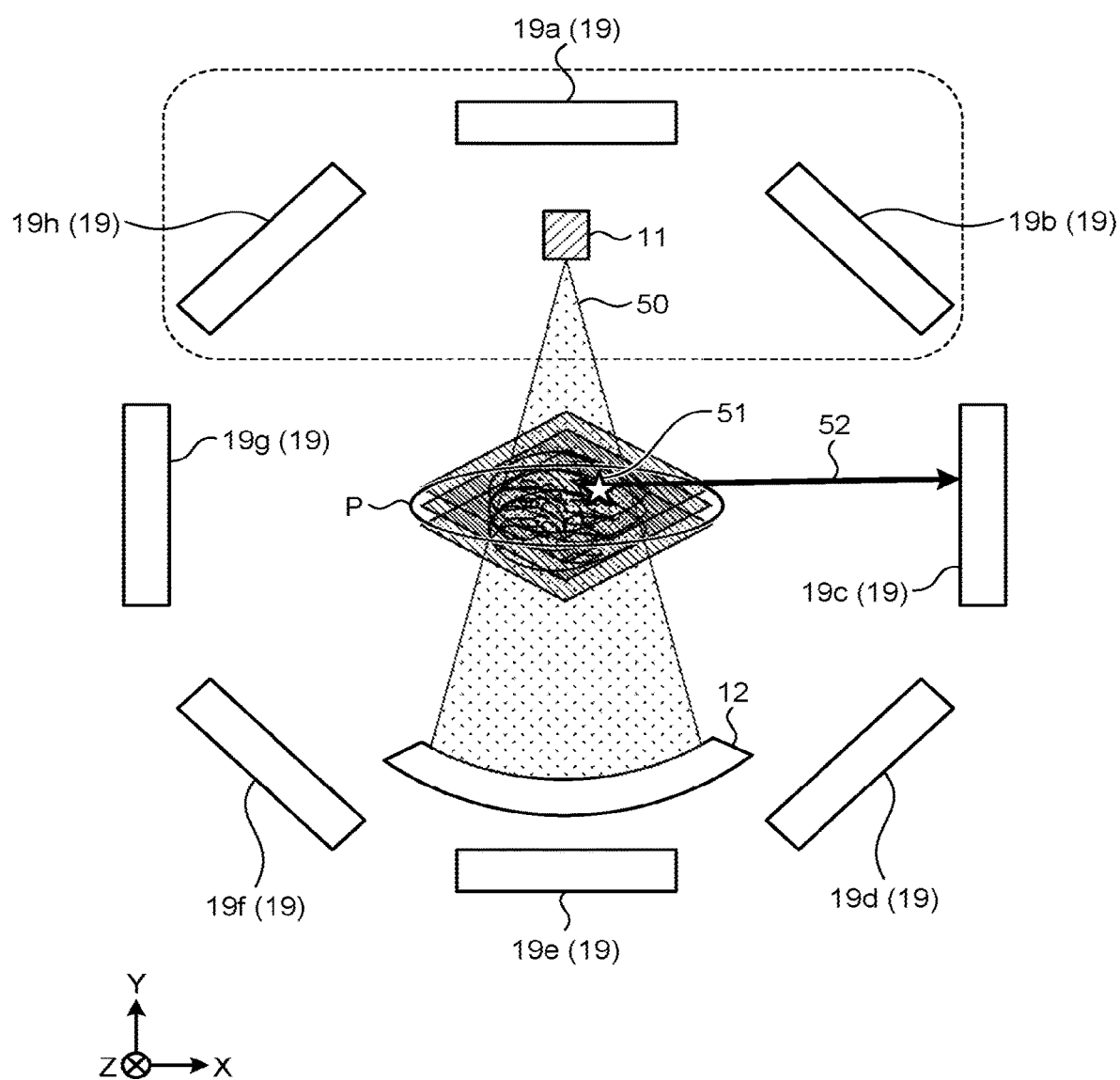
FIG. 5 is a diagram for explaining a plurality of fluorescent X-ray detectors included in an X-ray CT apparatus according to a second embodiment.

FIG. 5 is a diagram for explaining the plurality of fluorescent X-ray detectors 19 that are included in the X-ray CT apparatus 1 according to the second embodiment. The X-ray CT apparatus 1 according to the second embodiment includes, as illustrated in FIG. 5, the eight fluorescent X-ray detectors 19, for example. In the description of the second embodiment below, a case will be described in which the X-ray CT apparatus 1 includes the eight fluorescent X-ray detectors 19; however, the X-ray CT apparatus 1 may include a certain number of the fluorescent X-ray detectors 19, where the certain number is other than eight. The eight fluorescent X-ray detectors 19 are arranged on an outer side of the X-ray tube 11 and the X-ray detector 12. Further, the eight fluorescent X-ray detectors 19 are arranged in a concentric manner about a rotation axis of the rotary frame 13. In the following description, the eight fluorescent X-ray detectors 19 are referred to as fluorescent X-ray detectors 19a to 19h when they are explained in a distinguished manner.

In the second embodiment, the scan control function 445 determines the fluorescent X-ray detector 19 that detects the fluorescent X-ray 52 from among the eight fluorescent X-ray detectors 19a to 19h in accordance with a rotation position of the X-ray tube 11. Specifically, the scan control function 445 sequentially switches the fluorescent X-ray detector 19 for detecting the fluorescent X-ray 52 among the eight fluorescent X-ray detectors 19a to 19h in accordance with the rotation position of the X-ray tube 11 For example, if the rotation position of the X-ray tube 11 is a rotation position as illustrated in FIG. 5, the scan control function 445 determines the four fluorescent X-ray detectors 19c, 19d, 19f, and 19g that are located at positions at a side of the X-ray detector 12 relative to the X-ray tube 11, as the fluorescent X-ray detectors 19 for detecting the fluorescent X-ray 52. Specifically, for example, the scan control function 445 performs control such that signals that are output from the four fluorescent X-ray detectors 19c, 19d, 19f, and 19g that are determined as the fluorescent X-ray detectors 19 for detecting the fluorescent X-ray 52 are used when the marker distributed image data 56 is generated. The scan control function 445 is one example of a switching unit.

Furthermore, for example, if the rotation position of the X-ray tube 11 is a rotation position as illustrated in FIG. 5, the scan control function 445 performs control such that the fluorescent X-ray detector 19e that is located opposite to the X-ray tube 11 across the X-ray detector 12 among the eight fluorescent X-ray detectors 19a to 19h is not used as the fluorescent X-ray detector 19 for detecting the fluorescent X-ray 52. Specifically, for example, the scan control function 445 performs control such that a signal that is output from the fluorescent X-ray detector 19e is not used when various kinds of image data is generated. The scan control function 445 performs control such that the fluorescent X-ray detector 19 that is located opposite to the X-ray tube 11 across the X-ray detector 12 among the eight fluorescent X-ray detectors 19a to 19h is not used as the fluorescent X-ray detector 19 for detecting the fluorescent X-ray 52, in accordance with the rotation position of the X-ray tube 11. Specifically, the scan control function 445 sequentially switches the fluorescent X-ray detector 19 that is not used as the fluorescent X-ray detector 19 for detecting the fluorescent X-ray 52 among the eight fluorescent X-ray detectors 19a to 19h, in accordance with the rotation position of the X-ray tube 11.

The scan control function 445 determines the fluorescent X-ray detector 19 for detecting a back-scattered X-ray from among the eight fluorescent X-ray detectors 19a to 19h in accordance with the rotation position of the X-ray tube 11. Specifically, the scan control function 445 sequentially switches the fluorescent X-ray detector 19 for detecting the back-scattered X-ray among the eight fluorescent X-ray detectors 19a to 19h in accordance with the rotation position of the X-ray tube 11. For example, if the rotation position of the X-ray tube 11 is a rotation position as illustrated in FIG.

5, the scan control function 445 determines the three fluorescent X-ray detectors 19a, 19b, and 19h that are located at the side of the X-ray tube 11 as the fluorescent X-ray detectors 19 for detecting the back-scattered X-ray. Specifically, for example, the scan control function 445 performs control such that signals that are output from the three fluorescent X-ray detectors 19a, 19b, and 19h that are determined as the fluorescent X-ray detectors 19 for detecting the back-scattered X-ray are used when scattered image data is generated.

Meanwhile, in the second embodiment, the reconstruction function 443 generates CT image data that is derived from the back-scattered X-ray detected by the fluorescent X-ray detector 19, and the image processing function 444 generates scattered image data indicating a scattered image from the CT image data that is derived from the back-scattered X-ray. The display control function 446 causes the display 42 to display the scattered image based on the scattered image data. In the scattered image, information on a surface of the subject P is visualized. Therefore, in the second embodiment, it is possible to acquire new image information, such as identification of a surface state of the subject P, by measuring the back-scattered X-ray.

Thus, the X-ray CT apparatus 1 according to the second embodiment has been described above. According to the X-ray CT apparatus 1 of the second embodiment, it is possible to achieve the same effects as the X-ray CT apparatus 1 according to the first embodiment.

Third Embodiment

The X-ray CT apparatus 1 may include a single ring-shaped fluorescent X-ray detector. Therefore, an embodiment as described above will be described as a third embodiment. Meanwhile, in the explanation of the third embodiment, a difference from the first embodiment and the second embodiment will be mainly described, and the same configuration as the first embodiment and the second embodiment may be omitted in some cases.

The X-ray CT apparatus 1 according to the third embodiment includes a single ring-shaped fluorescent X-ray detector. The ring-shaped fluorescent X-ray detector is arranged on an outer side of the X-ray tube 11 and the X-ray detector 12. Further, the ring-shaped fluorescent X-ray detector is formed in a concentric manner about the rotation axis of the rotary frame 13. That is, in the third embodiment, the fluorescent X-ray detector is arranged in a ring form about the rotation axis of the rotary frame 13. The fluorescent X-ray detector according to the third embodiment is one example of a second X-ray detector.

In the third embodiment, the fluorescent X-ray detector includes a plurality of detection elements. The scan control function 445 according to the third embodiment performs the same control on the plurality of detection elements as the control that is performed on the plurality of fluorescent X-ray detectors 19 in the second embodiment.

In the third embodiment, the scan control function 445 determines a detection element for detecting the fluorescent X-ray 52 from among the plurality of detection elements that are included in the ring-shaped fluorescent X-ray detector, in accordance with the rotation position of the X-ray tube 11. Specifically, the scan control function 445 sequentially switches the detection element for detecting the fluorescent X-ray 52 among the plurality of detection elements that are included in the ring-shaped fluorescent X-ray detector, in accordance with the rotation position of the X-ray tube 11. For example, the scan control function 445 determines the detection element that is located at the side of the X-ray detector 12 relative to the X-ray tube 11 as the detection element for detecting the fluorescent X-ray 52. Specifically, for example, the scan control function 445 performs control such that a signal that is output from the detection element that is determined as the detection element for detecting the fluorescent X-ray 52 is used when the marker distributed image data 56 is generated.

Furthermore, the scan control function 445 performs control such that the detection element that is located opposite to the X-ray tube 11 across the X-ray detector 12 among the plurality of detection elements is not used as the detection element for detecting the fluorescent X-ray 52. Specifically, for example, the scan control function 445 performs control such that a signal that is output from the detection element that is located opposite to the X-ray tube 11 across the X-ray detector 12 among the plurality of detection elements is not used when various kinds of image data is generated. The scan control function 445 performs control such that the detection element that is located opposite to the X-ray tube 11 across the X-ray detector 12 among the plurality of detection elements is not used as the detection element for detecting the fluorescent X-ray 52, in accordance with the rotation position of the X-ray tube 11. Specifically, the scan control function 445 sequentially switches the detection element that is not used as the detection element for detecting the fluorescent X-ray 52 among the plurality of detection elements, in accordance with the rotation position of the X-ray tube 11.

The scan control function 445 determines a detection element for detecting a back-scattered X-ray from among the plurality of detection elements in accordance with the rotation position of the X-ray tube 11. Specifically, the scan control function 445 sequentially switches the detection element for detecting the back-scattered X-ray among the plurality of detection elements in accordance with the rotation position of the X-ray tube 11. For example, the scan control function 445 determines the detection element that is located at the side of the X-ray tube 11 as the detection element for detecting the back-scattered X-ray. Specifically, for example, the scan control function 445 performs control such that a signal that is output from the detection element that is determined as the detection element for detecting the back-scattered X-ray is used when s scattered image data is generated.

Thus, the X-ray CT apparatus 1 according to the third embodiment has been described above. According to the X-ray CT apparatus 1 of the third embodiment, it is possible to achieve the same effects as the X-ray CT apparatus 1 according to the first embodiment and the X-ray CT apparatus 1 according to the second embodiment.

Fourth Embodiment

In the first to the third embodiments, the cases have been described in which the fluorescent X-ray detectors are arranged on an outer side of the X-ray detector 12. However, a fluorescent X-ray detector may be arranged on an inner side of the X-ray detector 12. Therefore, an embodiment as described above will be described below as a fourth embodiment. Meanwhile, in the explanation of the fourth embodiment, a difference from the first to the third embodiments will be mainly described, and the same configuration as the first to the third embodiments may be omitted in some cases.

Figure 6:
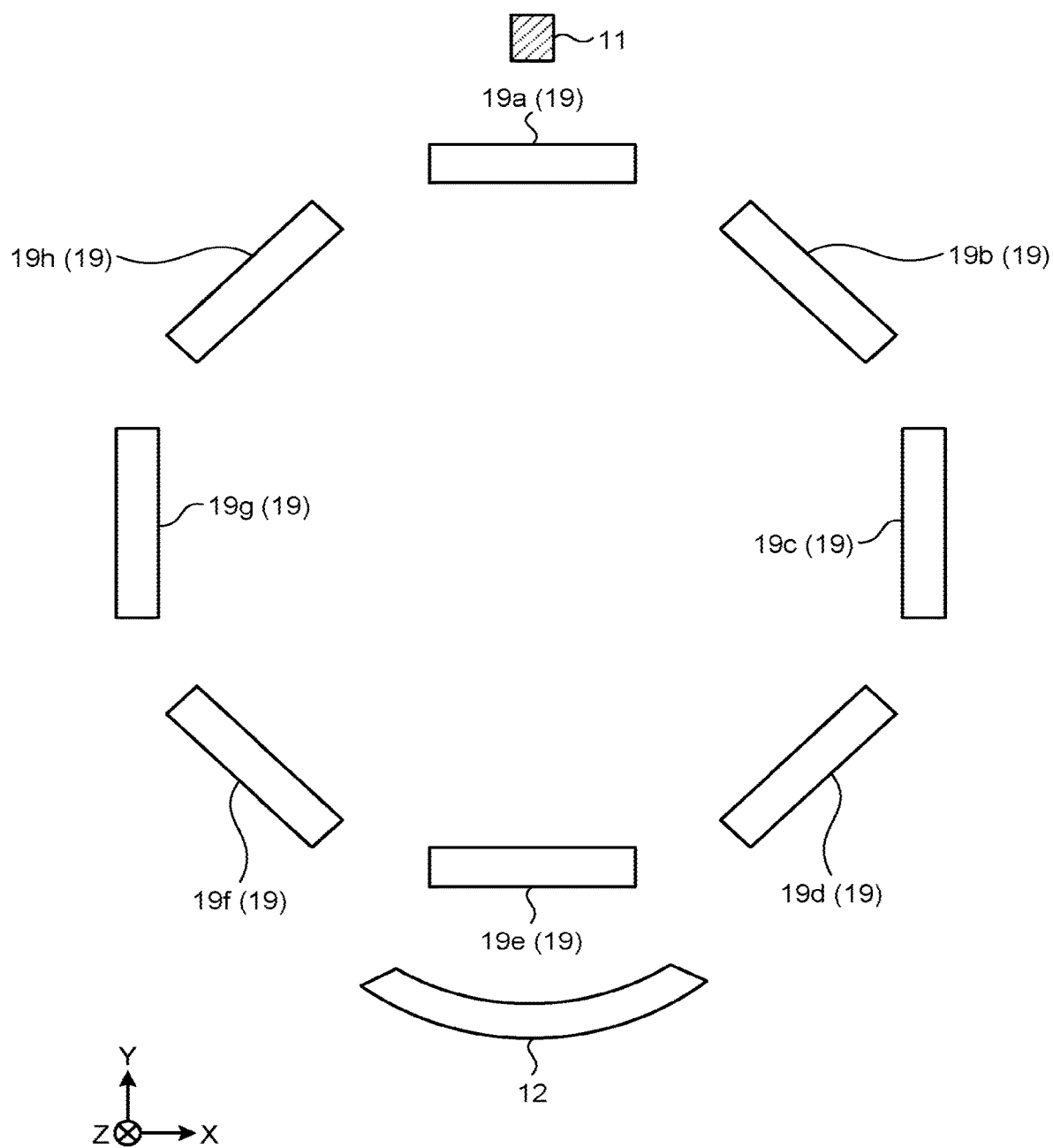
FIG. 6 is a diagram for explaining a plurality of fluorescent X-ray detectors included in an X-ray CT apparatus according to a fourth embodiment.
Figure 7:
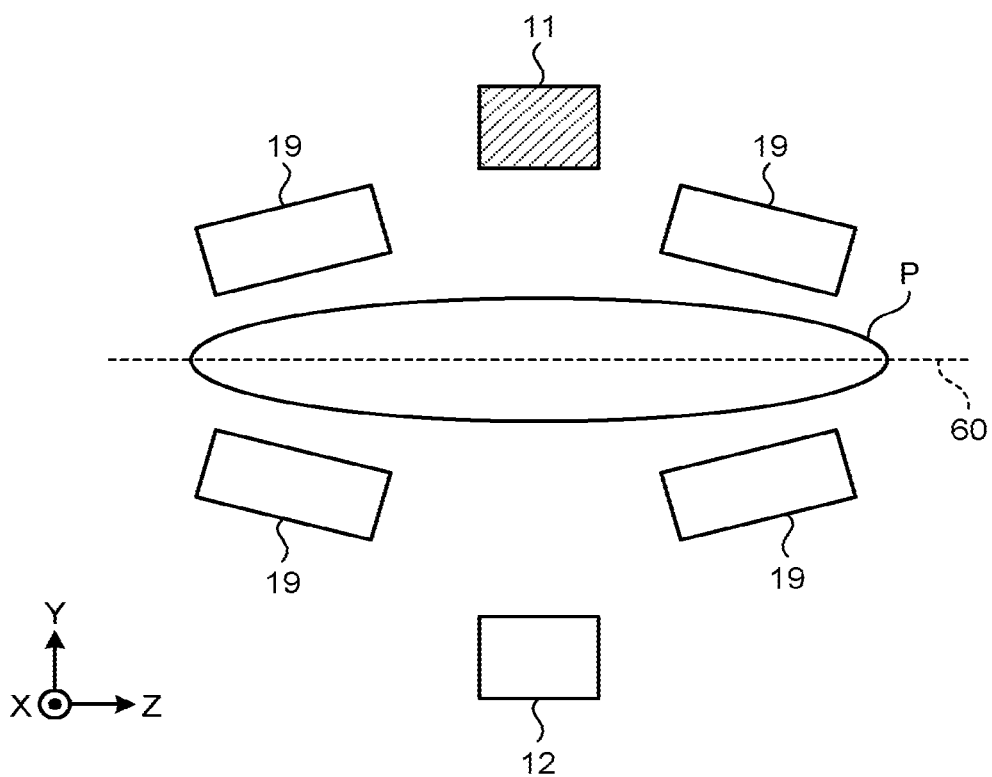
FIG. 7 is a diagram for explaining a positional relationship between the plurality of fluorescent X-ray detectors according to the fourth embodiment and an X-ray tube and a positional relationship between the plurality of fluorescent X-ray detectors and an X-ray detector.

FIG. 6 is a diagram for explaining the plurality of fluorescent X-ray detectors 19 that are included in the X-ray CT apparatus 1 according to a fourth embodiment. FIG. 7 is a diagram for explaining a positional relationship between the plurality of fluorescent X-ray detectors 19 and the X-ray tube 11 according to the fourth embodiment and a positional relationship between the plurality of fluorescent X-ray detectors 19 and the X-ray detector 12.

The X-ray CT apparatus 1 according to the fourth embodiment includes, as illustrated in FIG. 6, the eight fluorescent X-ray detectors 19, for example. In the following description of the fourth embodiment, a case will be described in which the X-ray CT apparatus 1 includes the eight fluorescent X-ray detectors 19, but the X-ray CT apparatus 1 may include a certain number of the plurality of fluorescent X-ray detectors 19, where the certain number is other than eight. The eight fluorescent X-ray detectors 19 are arranged on an inner side of the X-ray tube 11 and the X-ray detector 12. Further, the eight fluorescent X-ray detectors 19 are arranged in a concentric manner about the rotation axis of the rotary frame 13.

Here, if the X-ray generated from the X-ray tube 11 is incident on the fluorescent X-ray detector 19, the fluorescent X-ray detector 19 detects not only the fluorescent X-ray, but also the X-ray that is generated from the X-ray tube 11. In this case, independence of the observed energy spectrum is reduced.

Therefore, as illustrated in FIG. 7, the fluorescent X-ray detector 19 is arranged at a position deviated toward a rotation axis 60 of the rotary frame 13 with respect to the X-ray tube 11 and the X-ray detector 12. With this configuration, it is possible to prevent the X-ray detector 19 from detecting the X-ray that is generated from the X-ray tube 11.

Thus, the X-ray CT apparatus 1 according to the fourth embodiment has been described above. According to the X-ray CT apparatus 1 of the fourth embodiment, it is possible to achieve the same effects as the X-ray CT apparatus 1 according to the first to the third embodiments.

Meanwhile, in the first to the fourth embodiments, the cases have been described in which the fluorescent X-ray detector is fixed without rotating. However, a rotator that rotates may support the fluorescent X-ray detector in a rotatable manner. The rotator is a different mechanism from the rotary frame 13. For example, it may be possible to arrange three fluorescent X-ray detectors on a rotator such that the fluorescent X-ray detectors are separated from one another by 120 degrees about a rotation axis of the rotator. Further, each of the three fluorescent X-ray detectors may rotate by 1120 degrees.

Other Embodiments

In addition to the embodiments as described above, various embodiments may be made.

For example, the components of the apparatuses illustrated in the drawings are functionally conceptual and do not necessarily have to be physically configured in the manner illustrated in the drawings. In other words, specific forms of distribution and integration of the apparatuses are not limited to those illustrated in the drawings, and all or part of the apparatuses may be functionally or physically distributed or integrated in arbitrary units depending on various loads or use conditions. Further, for each processing function performed by each apparatus, all or any part of the processing function may be implemented by a CPU and a program analyzed and executed by the CPU or may be implemented as hardware by wired logic.

Furthermore, of the processes described in the embodiments, all or part of a process described as being performed automatically may also be performed manually. Alternatively, all or part of a process described as being performed manually may also be performed automatically by known methods. In addition, the processing procedures, control procedures, specific names, and information including various types of data and parameters illustrated in the above-described document and drawings may be arbitrarily changed unless otherwise specified.

Moreover, the methods described in the embodiments may be realized by executing a prepared program on a computer, such as a personal computer or a workstation. The program may be distributed via a network, such as the Internet. Furthermore, the control program may be recorded in a non-transitory computer readable recording medium, such as a hard disk, a flexible disk (FD), a compact disc (CD)-ROM, a magneto optical disk (MO), or a digital versatile disk (DVD), and may be executed by being read from the recording medium by a computer.

According to at least one of the embodiments as described above, it is possible to detect an X-ray for which independence of an observed energy spectrum is high.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Note 1
  An X-ray CT apparatus including:
    an X-ray tube that generates an X-ray,
    a first X-ray detector that is arranged so as to face the X-ray tube and detects the X-ray that has transmitted through a subject,
    a rotation unit that supports the X-ray tube and the first X-ray detector in a rotatable manner, and
    a second X-ray detector that detects a characteristic X-ray that is generated in accordance with a substance in the subject.
Note 2
  The second X-ray detector may be arranged in a ring shape about a rotation axis of the rotation unit.
Note 3
  The plurality of second X-ray detectors may be arranged about the rotation axis of the rotation unit.
Note 4
  The second X-ray detector may include an identification unit that identifies an incident direction of a characteristic X-ray that is to be detected.
Note 5
  The identification unit may be a collimator.
Note 6
  The identification unit may include a scattering body and identify an incident angle of a characteristic X-ray based on a scattering angle of the characteristic X-ray in the scattering body.
Note 7
  The X-ray CT apparatus may further include:
    a reconstruction unit that acquires first reconstructed image data that is reconstructed based on data detected by the first X-ray detector, and second reconstructed image data that is reconstructed based on data detected by the second X-ray detector, and a generation unit that generates display image data by associating the first reconstructed image data and the second reconstructed image data.

Note 8

The X-ray CT apparatus may further include:

a switching unit that switches a detection element for detecting the characteristic X-ray among a plurality of detection elements that are included in the second X-ray detected, in accordance with a rotation position of the X-ray tube.

Note 9

The X-ray CT apparatus may further include:

a switching unit that switches a second X-ray detector for detecting the characteristic X-ray among the plurality of second X-ray detectors, in accordance with a rotation position of the X-ray CT apparatus.

Note 10

The switching unit may further switch a detection element for detecting a back-scattered X-ray among the plurality of detection elements, in accordance with a rotation position of the X-ray tube.

Note 11

The switching unit may further switch an X-ray detector for detecting a back-scattered X-ray among the plurality of X-ray detectors, in accordance with a rotation position of the X-ray tube.

Note 12

The switching unit may perform control such that a detection element that is located opposite to the X-ray tube across the first X-ray detector among the plurality of X-rays the detection element is not used as a detection element for detecting the characteristic X-ray.

Note 13

The switching unit may perform control such that an X-ray detector that is located opposite to the X-ray tube across the first X-ray detector among the plurality of X-ray detectors is not used as an X-ray detector for detecting the characteristic X-ray.

Note 14

The second X-ray detector may be arranged on an inner side of the first X-ray detector and at a positon that is deviated in a rotation axis direction of the rotation unit with respect to the first X-ray detector.

Note 15

An X-ray CT apparatus including:

an X-ray tube that generates an X-ray, a first X-ray detector that is arranged so as to face the X-ray tube and detects the X-ray that has transmitted through the subject, a rotation unit that supports the X-ray tube and the first X-ray detector in a rotatable manner, a plurality of second X-ray detectors that detect a characteristic X-ray that is generated in accordance with a substance in the subject, and a switching unit that switches an X-ray detector for detecting a back-scattered X-ray among the plurality of X-ray detectors, in accordance with a rotation position of the X-ray tube.

What is claimed is:

1. An X-ray CT apparatus, comprising:
   an X-ray tube that generates an X-ray;
   a first X-ray detector that is arranged so as to face the X-ray tube and detects the X-ray that has transmitted through a subject;
   a rotator that supports the X-ray tube and the first X-ray detector in a rotatable manner; and
   a second X-ray detector that detects a characteristic X-ray that is generated in accordance with a substance in the subject, wherein the second X-ray detector is arranged on an inner side or an outer side of the first X-ray detector.

2. The X-ray CT apparatus according to claim 1, wherein the second X-ray detector is arranged in a ring shape about a rotation axis of the rotator.

3. The X-ray CT apparatus according to claim 1, wherein the plurality of second X-ray detectors is arranged about the rotation axis of the rotator.

4. The X-ray CT apparatus according to claim 1, wherein the second X-ray detector includes an identification unit that identifies an incident direction of a characteristic X-ray that is to be detected.

5. The X-ray CT apparatus according to claim 4, wherein the identification unit is a collimator.

6. The X-ray CT apparatus according to claim 4, wherein the identification unit includes a scattering body and identifies an incident angle of a characteristic X-ray based on a scattering angle of the characteristic X-ray in the scattering body.

7. The X-ray CT apparatus according to claim 1, further comprising:
   processing circuitry that acquires first reconstructed image data that is reconstructed based on data detected by the first X-ray detector, and second reconstructed image data that is reconstructed based on data detected by the second X-ray detector, and generates display image data by associating the first reconstructed image data and the second reconstructed image data.

8. The X-ray CT apparatus according to claim 2, further comprising:
   processing circuitry that switches a detection element for detecting the characteristic X-ray among a plurality of detection elements that are included in the second X-ray detected, in accordance with a rotation position of the X-ray tube.

9. The X-ray CT apparatus according to claim 3, further comprising:
   processing circuitry that switches a second X-ray detector for detecting the characteristic X-ray among the plurality of second X-ray detectors, in accordance with a rotation position of the X-ray CT apparatus.

10. The X-ray CT apparatus according to claim 8, wherein the processing circuitry further switches a detection element for detecting a back-scattered X-ray among the plurality of detection elements, in accordance with the rotation position of the X-ray tube.

11. The X-ray CT apparatus according to claim 9, wherein the processing circuitry further switches an X-ray detector for detecting a back-scattered X-ray among the plurality of X-ray detectors, in accordance with the rotation position of the X-ray tube.

12. The X-ray CT apparatus according to claim 8, wherein the processing circuitry further performs control such that a detection element that is located opposite to the X-ray tube across the first X-ray detector among the plurality of X-rays the detection element is not used as a detection element for detecting the characteristic X-ray.

13. The X-ray CT apparatus according to claim 9, wherein the processing circuitry further performs control such that an X-ray detector that is located opposite to the X-ray tube across the first X-ray detector among the plurality of X-ray detectors is not used as an X-ray detector for detecting the characteristic X-ray.

14. The X-ray CT apparatus according to claim 1, wherein the second X-ray detector is arranged at a position that is deviated in a rotation axis direction of the rotator with respect to the first X-ray detector.

15. An X-ray CT apparatus, comprising:
- an X-ray tube that generates an X-ray;
- a first X-ray detector that is arranged so as to face the X-ray tube and detects the X-ray that has transmitted through the subject;
- a rotator that supports the X-ray tube and the first X-ray detector in a rotatable manner;
- a plurality of second X-ray detectors that detect a characteristic X-ray that is generated in accordance with a substance in the subject; and
- processing circuitry that switches an X-ray detector for detecting a back-scattered X-ray among the plurality of X-ray detectors, in accordance with a rotation position of the X-ray tube, wherein the second X-ray detector is arranged on an inner side or an outer side of the first X-ray detector.

* * * * *